G. STRANDT.
COMBINED MILK BOTTLING AND CAPPING MACHINE.
APPLICATION FILED DEC. 23, 1912.
1,174,453.
Patented Mar. 7, 1916.
7 SHEETS—SHEET 2.
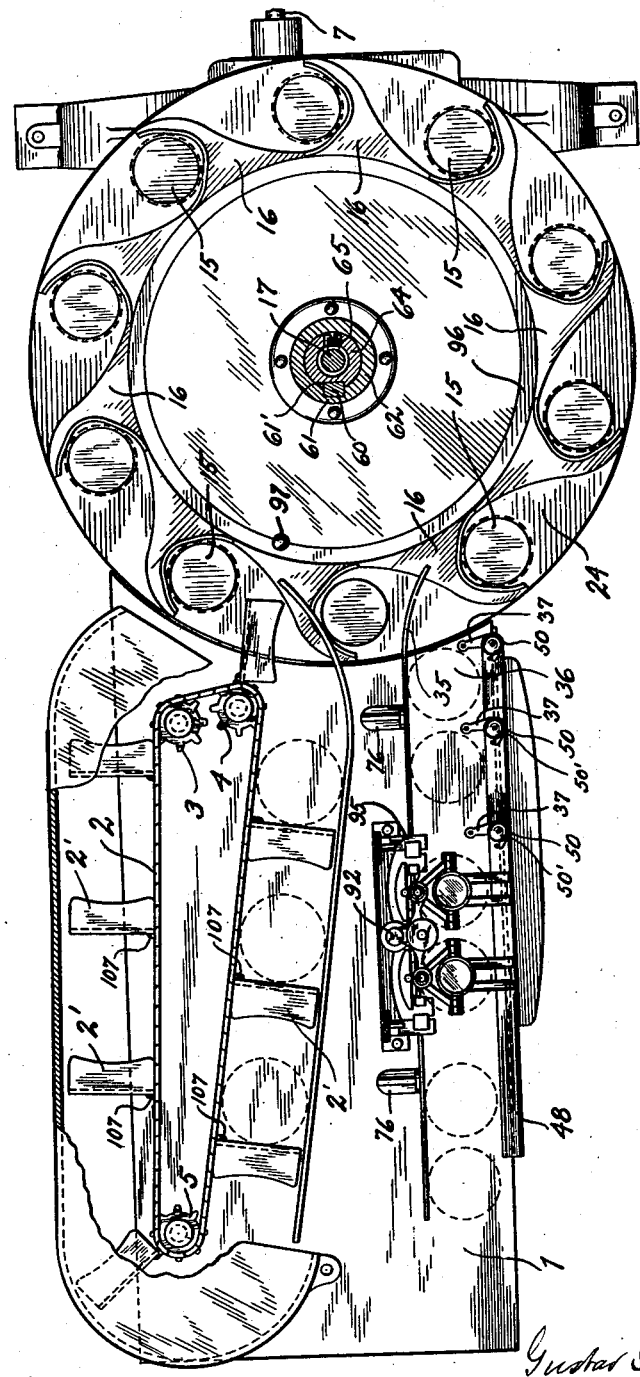

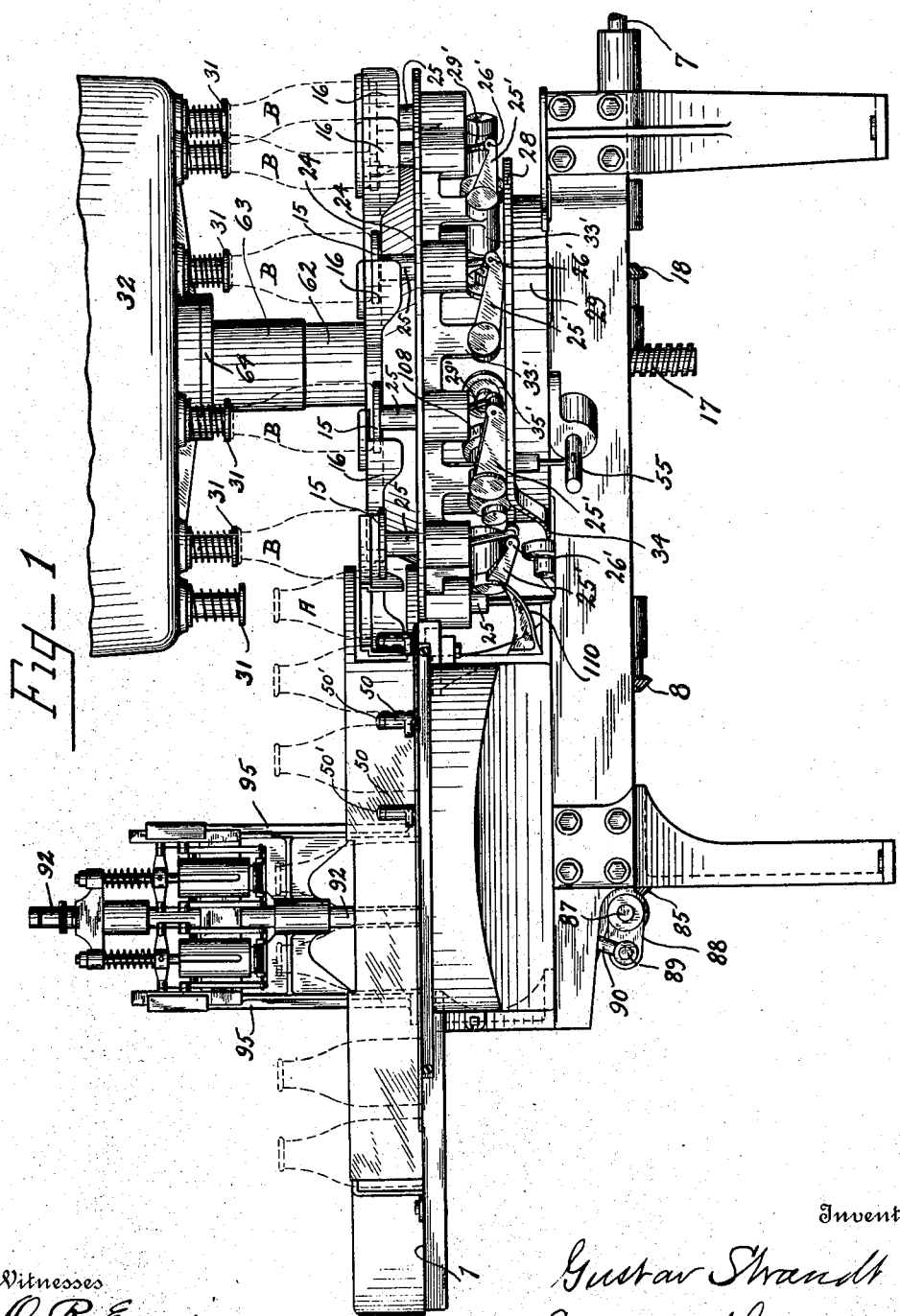

G. STRANDT.
COMBINED MILK BOTTLING AND CAPPING MACHINE.
APPLICATION FILED DEC. 23, 1912.
1,174,453.
Patented Mar. 7, 1916.
7 SHEETS—SHEET 3.
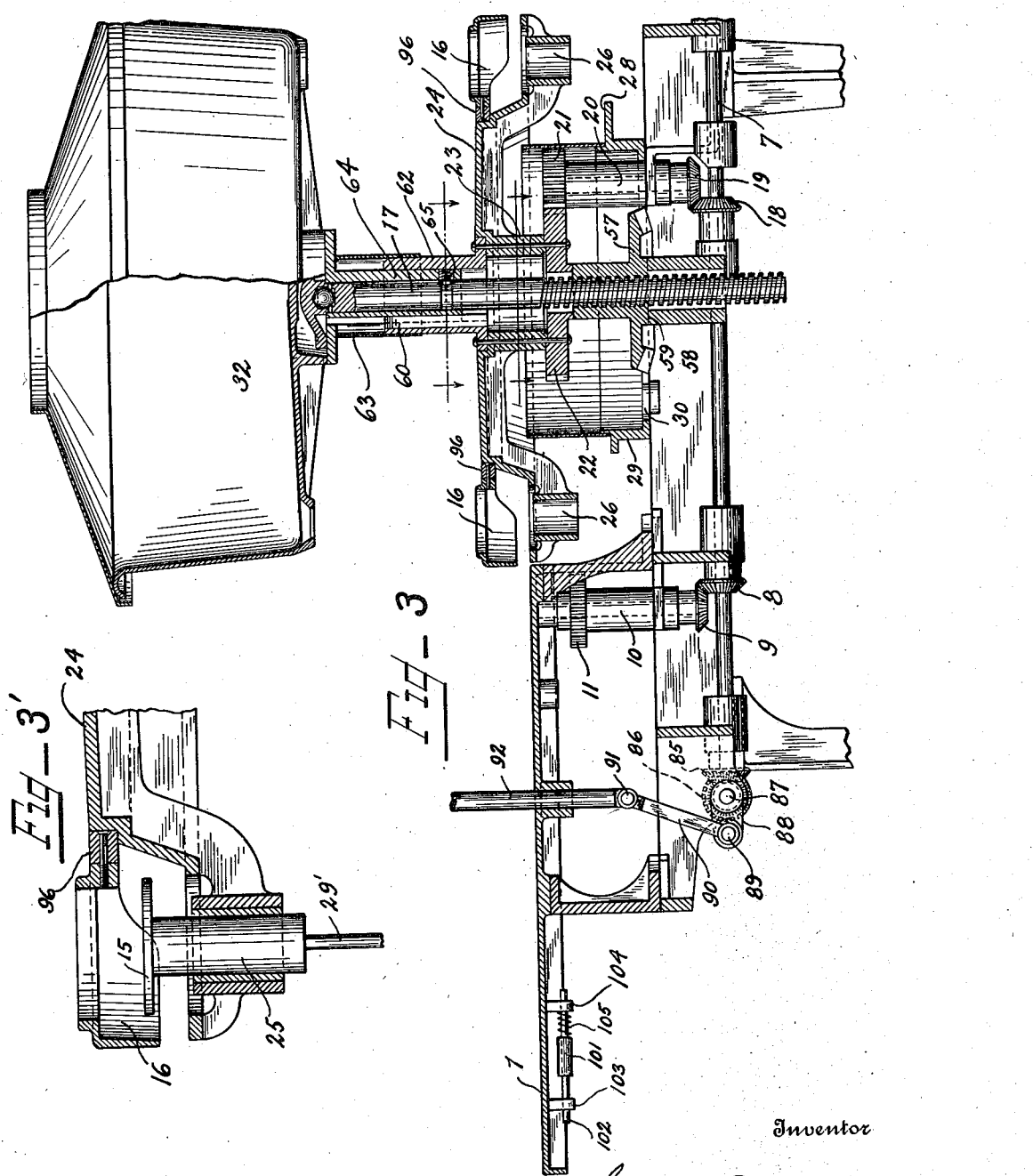

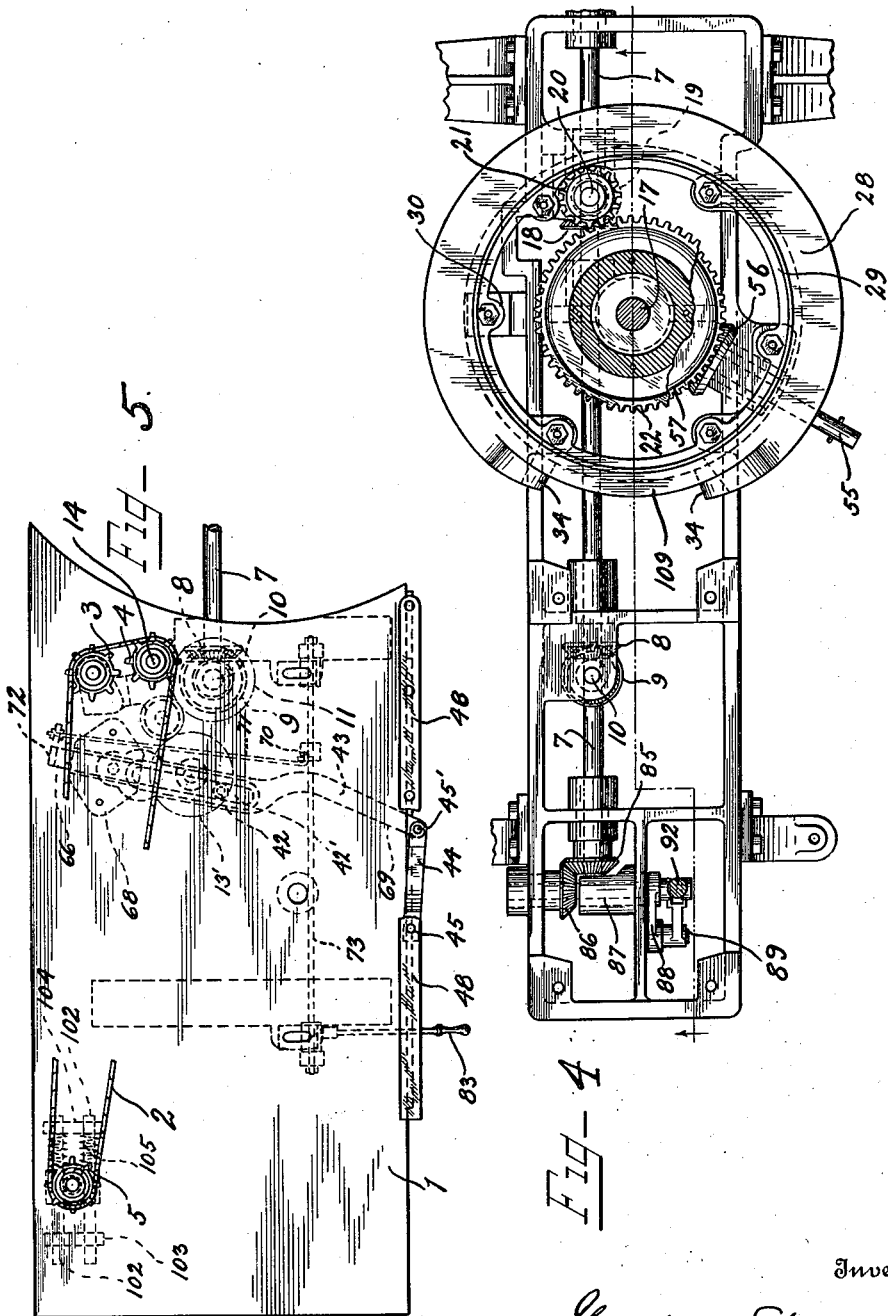

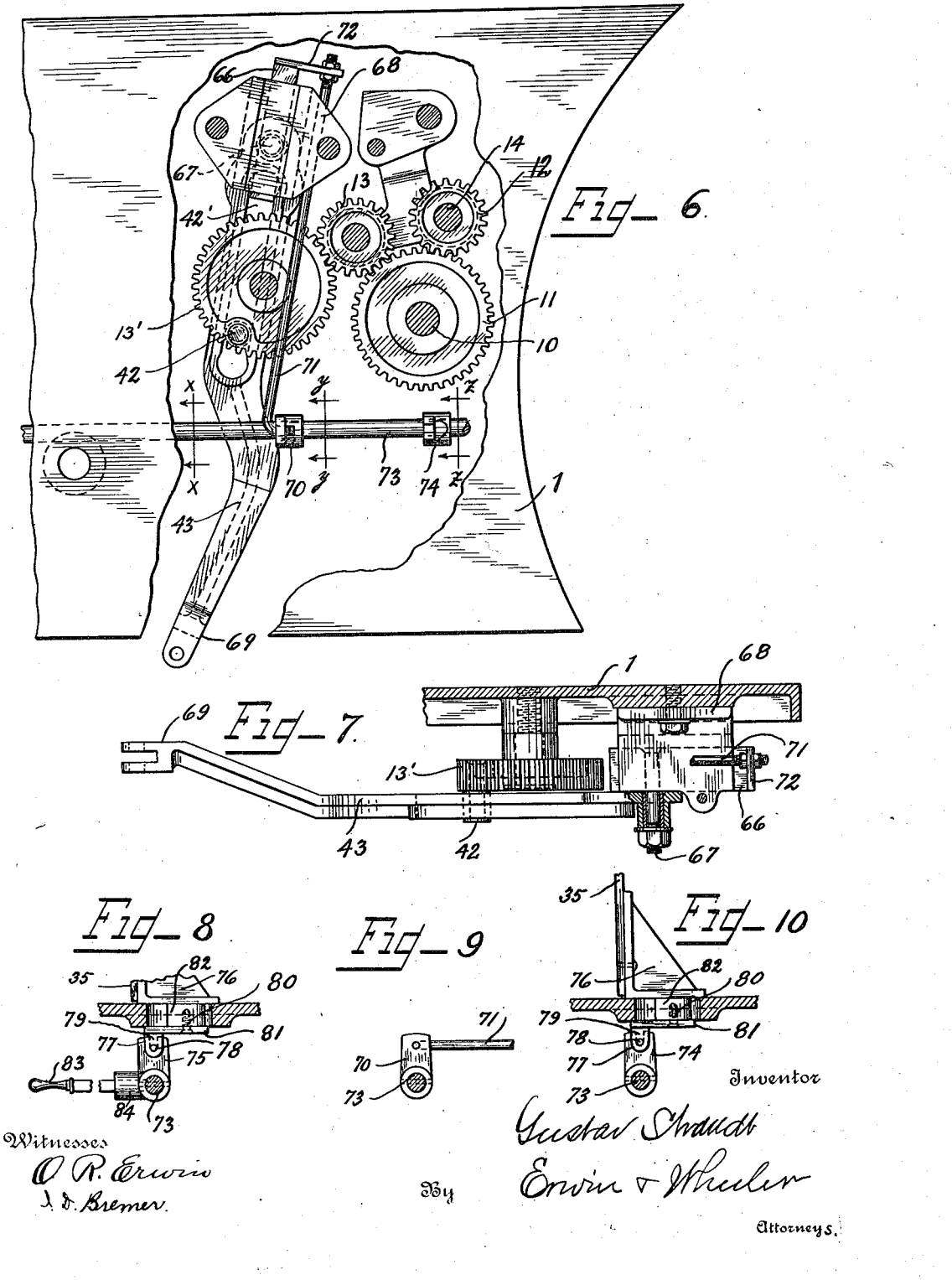

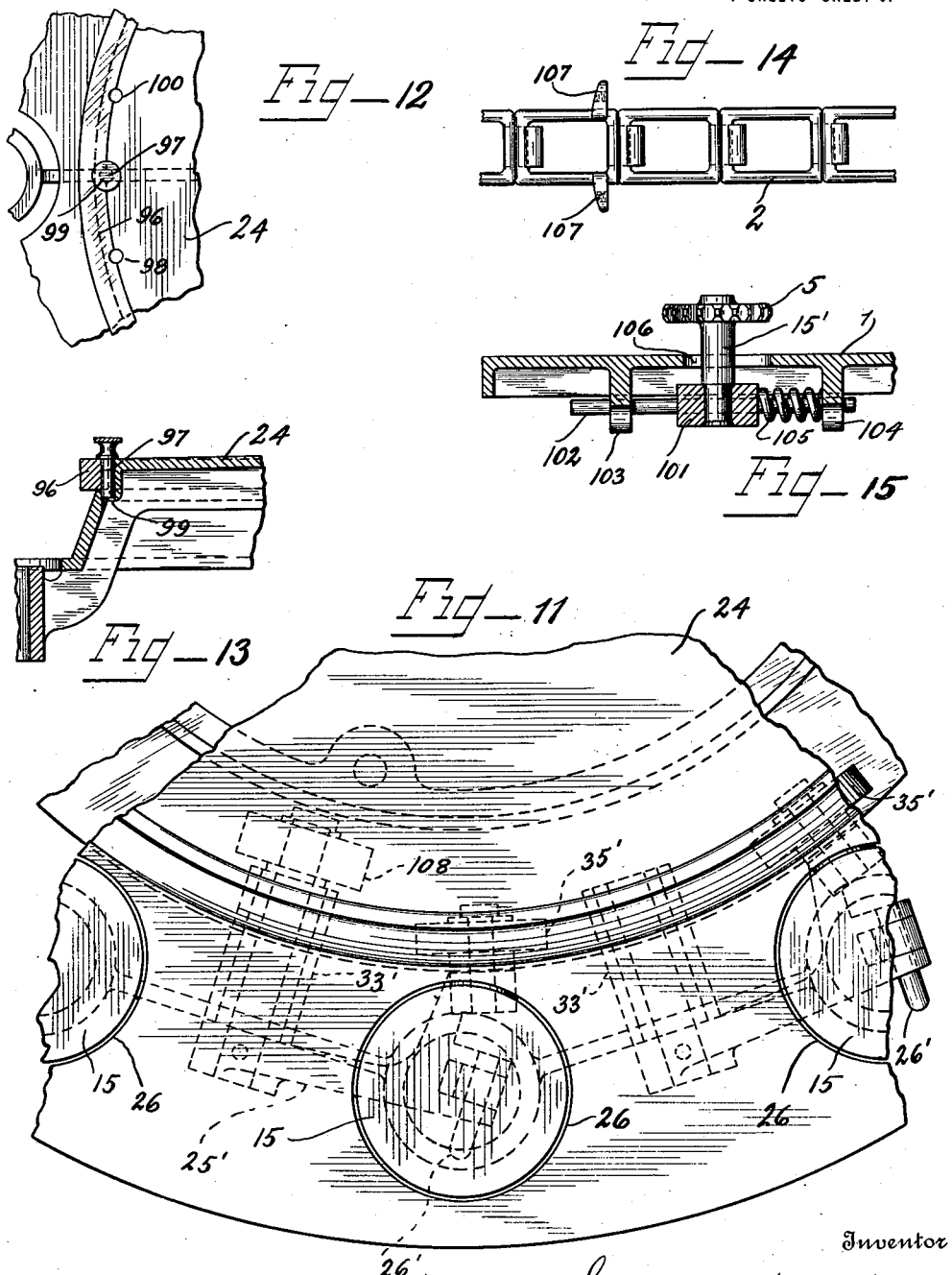

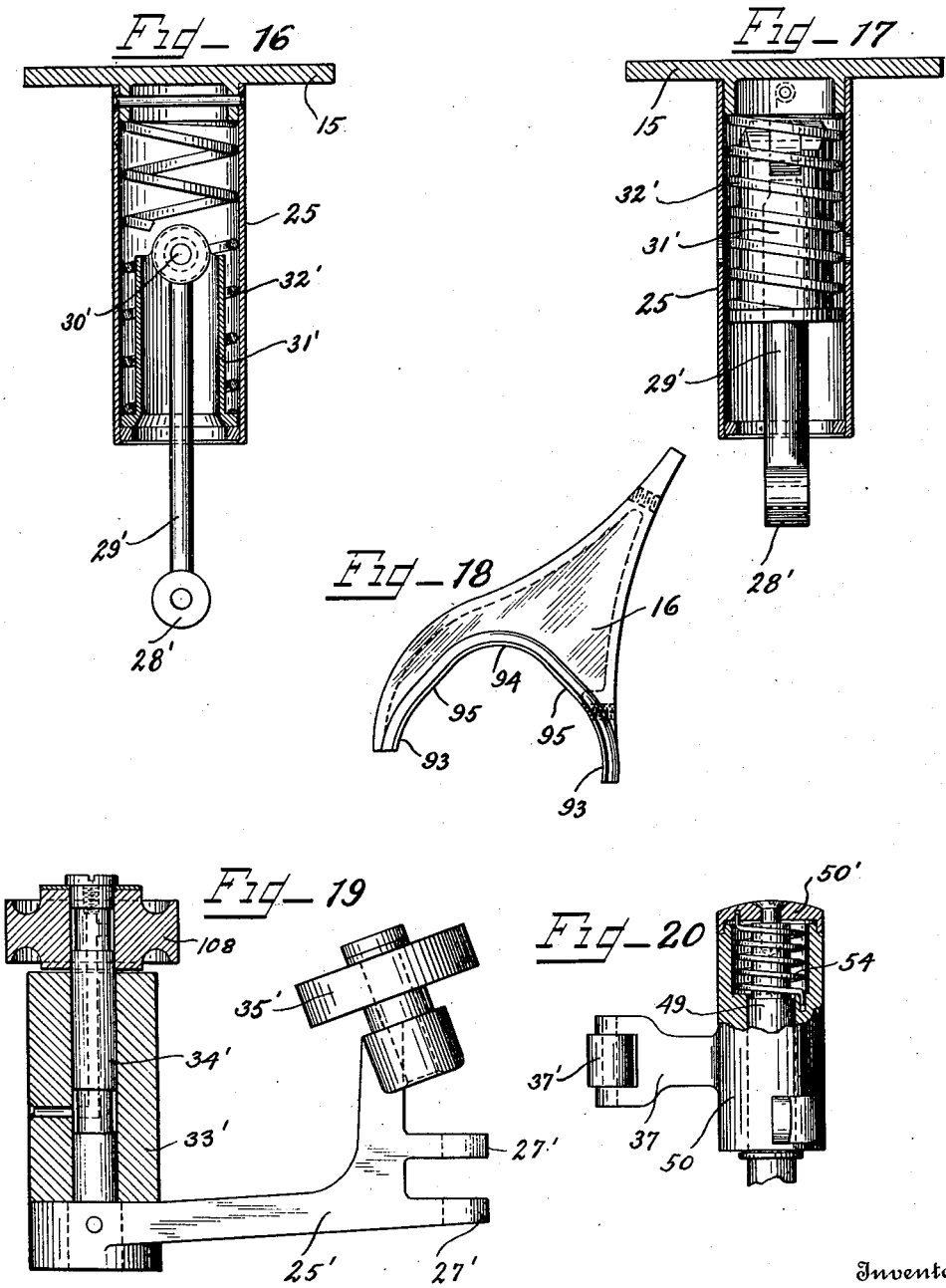

UNITED STATES PATENT OFFICE.

GUSTAV STRANDT, OF MILWAUKEE, WISCONSIN.

COMBINED MILK BOTTLING AND CAPPING MACHINE.

1,174,453.  Specification of Letters Patent.  Patented Mar. 7, 1916.

Application filed December 23, 1912. Serial No. 738,148.

*To all whom it may concern:*

Be it known that I, GUSTAV STRANDT, a citizen of the United States, residing at the city of Milwaukee, county of Milwaukee, and State of Wisconsin, have invented new and useful Improvements in Combined Milk Bottling and Capping Machines, of which the following is a specification.

My invention relates to improvements in machines for filling and simultaneously placing paper caps in bottles, and it pertains more especially, among other things—1st, to the device for raising and filling the bottles while they are being moved forward by the revoluble conveyer; 2nd, to the device for manually adjusting the tank to bottles of different heights; 3rd, to the device for adjusting the bottle carrying brackets to bottles of different diameters and 4th, to the device for removing the bottles from the revoluble conveyer to the capping device.

My invention is further explained by reference to the accompanying drawings, in which—

Figure 1 represents a side view. Fig. 2 is a top view. Fig. 3 is a vertical section. Fig. 3' is an enlarged side view of one of the bottle supporting disks and a vertical section of the mechanism for supporting and guiding the same. Fig. 4 is a top view of the frame with the bottle filling mechanism and capper removed. Fig. 5 is a top view of the stationary bottle supporting platform. Fig. 6 is a top view of the platform shown in Fig. 5, part broken away showing the operative mechanism below. Fig. 7 is a detail of an adjusting arm shown in Fig. 6. Fig. 8 is a section, drawn on line $x$—$x$ of Fig. 6. Fig. 9 is a detail drawn on line $y$—$y$ of Fig. 6. Fig. 10 is a section, drawn on line $z$—$z$ of Fig. 6. Fig. 11 is a top view of a part of the revoluble table and a number of bottle supporting disks. Fig. 12 is a top view, and Fig. 13 is a sectional view of a part of the revoluble conveyer showing the mechanism for adjusting the bottle carrying brackets. Fig. 14 is a side view of a portion of the feed chain. Fig. 15 is a sectional view of a device for tightening the feed chain. Figs. 16 and 17 are vertical sections of bottle lifting mechanism, drawn at right angles to each other. Fig. 18 is a plan view of one of the bottle carrying brackets removed from the machine. Fig. 19 is a plan view, part in section, of the device for operating the bottle lifting mechanism; and Fig. 20 is a side view, part broken away, of one of the bottle moving fingers.

Like parts are identified by the same reference numerals throughout the several views.

1 represents a stationary platform upon which bottles are manually placed preparatory to being moved forward by a conveyer, which conveyer comprises an endless chain 2 and the laterally projecting arms 2'. The chain 2 is supported upon three sprocket wheels 3, 4, and 5. Motion is communicated from a source of power to such conveyer through the driving shaft 7, miter gears 8 and 9, vertical shaft 10, pinions 11, 12 and 13, and vertical shaft 14, whereby as the bottles are placed upon the platform 1, they are carried forward by the radial arms 2', as indicated in Fig. 2, to the annular series of disks 15 of the revoluble conveyer. The revoluble conveyer comprises the central member 23, revoluble platform 24, and the annular series of U-shaped arms 16. Motion is communicated from a moving power to the shaft 17, and from thence to said annular series of disks 15, through the driving shaft 7, miter gears 18 and 19, vertical shaft 20, pinion 21, and gear wheel 22, which gear wheel 22 is mounted upon and communicates motion to said vertical shaft 17. Said annular series of disks 15 are centrally supported from the upper side of the gear wheel 22 through the central member 23, annular revoluble platform 24 and vertical members 25. The revoluble platform 24 is provided with a series of apertures 26 for the reception of the vertical members 25, which have a vertical movement upwardly and downwardly in said apertures as said platform 24 is revolved.

The lower ends of the vertical members 25 are pivotally connected with the trailing arms 25' by pivotal pins 26', which pins have bearings in the lugs 27', 27', of said arms 25' and in the collar 28', which collar 28' is connected with said disk supporting member 25 through the links 29', pivotal bolts 30' and sleeves 31'. The sleeves 31' are inclosed within said disk supporting members 25 and are yieldingly retained in place by spiral springs 32', while the front sides of said trailing arms 25' are pivotally connected with the platform 24 through the vertical hangers 33' by the bolts 34'. The free ends of the trailing arms 25' are provided with rollers 35', which are adapted to rest upon the annular track 28, which track 28 is supported from the circular frame 29 by a series of lugs 30. The annular track 28 is curved upwardly and downwardly, whereby as the rollers 35' traverse the same, the disks 15 will be caused to gradually rise and fall as they are being revolved by the revoluble conveyer over said stationary track 28, and whereby the bottles which are supported on said disks will be brought into contact with the filling nozzles 31. The filling nozzles 31 are respectively connected with the lower side of the liquid tank 32, and said tank 32 is supported upon said shaft 17. The nozzles 31 are of ordinary construction and are adapted, as the bottles are pressed upwardly against them, to open a liquid controlling valve, whereby the bottles are simultaneously filled as they are revolved with said tank. When, however, the bottles have been filled, the movement of the machine is so timed that they will pass from above the upper plane of the track to a point above its lower plane, and in so doing, said disks will be caused to descend a distance corresponding with the different planes of said track, whereby the bottles will be brought out of contact with said nozzles, preparatory to being removed from their supporting disks.

When the bottles have been successively filled and have completed their revolution with the revoluble platform 24, they will be brought into contact with the stationary angular arm 35, whereby they will be removed from the disks 15 of the annular series to the stationary platform 1 in the space 36.

37 are reciprocating arms. The reciprocating movement of the arms 37 is predetermined and so timed in relation to the revoluble platform 24, as to reach the limit of their reciprocating movement toward the right, (reference being had to Fig. 2) the instant two bottles have been deposited upon the stationary platform 1, when by the reverse movement of said arms 37 two of the bottles which have been thus deposited in the space 36, are carried forwardly by said reciprocating arms 37, 37, and deposited under the capper, preparatory to being capped. Motion is communicated from the shaft 7 to the reciprocating arms 37 through the miter gears 8 and 9, shaft 10, wheels 11, 13 and 13', pitman 42, operating in slot 42', lever 43, link 44, pivotal bolts 45, 45', reciprocating bar 48, vertical standards 49, 49, arm supporting members 50, 50, arms 37, 37, and rollers 37'.

The arms 37 are rigidly affixed to the supporting members 50, and said supporting members 50 are revolubly supported from the vertical standards 49 and are yieldingly retained in place by the spiral springs 54, one end of said springs being affixed to the cap 50', while their opposite ends are affixed to said arm supporting member 50, whereby said arms are normally retained at nearly right angles to the supporting bar 48, but are adapted to be inclined at an angle thereto, and thrown toward the left, reference being had to Fig. 2, as they are brought in contact with the bottles. Thus it will be obvious that when two bottles are in place in the space 36 and the bar 48 is moved toward the right, as previously described, said arms 37 will be inclined toward the left until they pass such bottles, when they will be thrown by the recoil of said springs back to their normal position at right angles to said bar, preparatory to being moved in the opposite direction by the action of the machine, whereby such bottles will be moved forwardly from the space 36 to and under the capper, preparatory to being capped. It will be understood that the coöperating members of the machine are so timed that the bottles will be removed from the revoluble disks to the capping machine as fast as they are filled, and that when two bottles have been thus capped, they will be displaced and moved from the capping machine by contact of the next two succeeding bottles, as such bottles are moved forwardly by the action of said laterally projecting arms 37.

Referring to Fig. 1, the bottle A is supported from the lower plane 34 of the annular track 28 and upon the same plane with the stationary platform or table 1. When, however, the bottles have moved forwardly toward the right, the wheel 35' passes up the incline to the high plane of said track, whereby the bottles are brought in contact with the nozzle 31, through which they are filled from the tank 32, as previously described. The series of bottles B, B, (Fig. 1), are indicated as supported on the higher plane of the track in contact with said stoppers. When, however, the machine is being used for filling bottles of different sizes from those shown, the space between the tank 32 and the annular series of bottle supporting disks 15 must be increased or diminished to conform to the height of such bottles as are being thus filled. To accomplish this object, the shaft 17 is slidably connected with the revoluble conveyer through which it passes, and a vertical movement is communicated to said shaft 17 from the manually operated shaft 55, through the miter pinion 56, miter gear 57, which miter gear 57 is carried by said shaft 17. The lower end of said shaft is provided with a screw thread which has screw threaded bearings in the hub of said miter gear 57 and said gear 57 is supported from the stationary frame member 58 of the machine upon the stationary collar 59, whereby as said shaft 55 is revolved toward the right and left, said central shaft 17 is raised and lowered, and whereby the tank 32 is adjusted to bottles of different heights. The shaft 17 is prevented from turning with the threaded hub of the miter gear 57 by the key 60, which key 60 operates in vertical grooves 61 of the telescoping collar 62, and grooves 61' of the hub 64, which collar 62 is rigidly connected with the revoluble platform 24 and has slidable bearings in the inclosing telescoping collar 63. The vertical shaft 17 is adapted to be rigidly connected with the tank 32 through the hollow hub 64, and the set screw 65, which set screw has threaded bearings in said hub. Thus it is obvious that by revolving said shaft 55 in one direction, said tank will be raised, and by revolving said shaft 55 in the opposite direction, said tank will be lowered, whereby said tank, together with the nozzles 31 may be adjusted, as stated, for bottles of different heights.

To adapt my machine for capping bottles of different sizes, it becomes necessary to adjust the mechanism by which the bottles are led from the filling mechanism to the capping mechanism to correspond with the size of the bottles. To accomplish this object, the length of the stroke of the reciprocating bar 48 must be increased or diminished to correspond with the diameter of the bottles being capped. To accomplish this object, one end of the operating lever 43 is pivotally supported from the adjustable block 66 on the pivotal bolt 67, and said block 66 is adapted to be adjusted nearer to or farther from the front end of said lever upon the stationary bracket 68, which bracket 68 is rigidly bolted to the stationary plate 1 of the machine. It will be understood that the front end of the lever 43 is caused to vibrate forwardly and backwardly with each revolution of the gear 13', and that said gear 13' is connected with said lever by the trunnion 42, which operates, as previously stated, in the slot 42', as shown in Fig. 6. It will now be understood that the swing or length of the reciprocating movement of the front end 69 of said lever will be increased or diminished as the block 66 is moved away from or toward such front end, whereby the length of the reciprocating movement of the slide 48 and the bottle carrying arms 50 connected therewith, will be thereby increased or diminished to correspond with the diameter of the bottles moved by said arms. The movement of the arm 43 is manually controlled by the operator through the lever 70, and the lever 70 is connected with the sliding block 66 through the rod 71 and end plate 72, the end of said rod 71 having pivotal bearings in said lever 70, whereby as said lever is moved in one direction, the length of the stroke of the arm 43 is increased and when moved in the opposite direction, such movement is diminished. The lever 70 is pivotally supported from the table 1 upon the shaft 73.

It will be understood that the guide bar 35 is necessarily adjusted nearer to or farther from the reciprocating bar 48 to correspond with the diameter of the bottles, and that such bar is simultaneously adjusted as the length of the stroke of the operating arms is adjusted, and that motion is communicated from the shaft 73 to said guide bar 35 near its respective ends through the arms 74 and 75, and brackets 76, 76, which arms are pivotally connected with said brackets through the lugs 77, said lugs 77 being provided with transverse pins 78 operating in the radial slots 79 of the arms 74 and 75. It will be understood that the lugs 77 are connected with the brackets 76 through screws 80 and horizontal plates 81, which are formed integral with said lugs. Also that a vertical projection 82 is formed integral with the brackets 76 and that said vertical projection is rigidly connected with the horizontal plates 81 by said screws 80. It will also be understood that by turning the shaft 73 a partial revolution in its bearings, both the reciprocating movement of the plate 48 and the guide bar 35 are simultaneously adjusted, and that said shaft 73 is thus given a partial revolution manually through the operating lever 83, which is rigidly connected with said shaft through the hub 84.

Motion is communicated from the revoluble shaft 7 to the capper through the beveled pinions 85 and 86, shaft 87, crank arm 88, trunnion 89, link 90, pivotal bolt 91 and vertically reciprocating rod 92. The so called capper or device for placing paper caps in the mouths of the bottles as they are being filled, forms the subject matter of United States Letters Patent, numbered 1040453, dated October 8th, 1912, and further description herein is therefore unnecessary. Said capper is however supported from the stationary platform 1 by vertical standards 95, 95, and the same is connected with a movable member of the machine through said vertical rod 92, whereby with each revolution of the shaft 87, a vertical reciprocating movement is communicated to the vertical rod 92 and from thence to the operating mechanism of the capper, as previously described.

While the capper above described is adapted to place the caps upon two bottles at a time, it will be obvious that cappers may be used which are adapted to place the caps in a greater or less number of bottles.

The contact bearings of the U-shaped arm 16 are preferably so formed as to fit bottles of several different sizes. Figs. 2 and 18 of the drawings show said arms formed for three different sizes of bottles. When the machine is used for filling larger bottles, they are adapted to contact with the two opposing bearings 93, 93, which form arcs of the circle described by such larger bottles. When, however, the machine is used for filling smaller bottles, they are adapted to contact with the central bearing 94, which conforms to the arc of the circle described by the smaller bottles, and when used for filling intermediate sized bottles, they are adapted to contact at the point 95. It follows that when the machine is being used for filling small bottles, it becomes necessary to move the annular series of arms 16 a partial revolution so as to bring the smaller arc of the circle 94 directly above the bottle supporting disks 15, and to accomplish this object, all of said arms 16 are rigidly connected to the annular collar 96 and the collar 96, together with said arms 16, are adapted to be moved backwardly or forwardly as the tank 32 is raised or lowered. Motion is communicated to said arms by turning said collar 96 a partial revolution in its bearings. The collar 96 is locked in place by the fastening pin 97, which is inserted in the vertical aperture 99. Said vertical apertures are formed one-half in said annular collar 96 and the other half in the periphery of the annular platform 24. Thus it is obvious that when desirous to adjust the device for filling larger or smaller bottles, the pin 97 is removed from the central aperture 99, when the collar 96 is turned a partial revolution until one-half of one of the other apertures 98 or 100 registers with the aperture 99, when the pin 97 is again inserted in said aperture 99, when the collar 96 is retained at the desired point of adjustment to correspond with the size of the bottles which are being filled. It will of course be understood that the adjustment of the brackets 16 for larger or smaller bottles corresponds with and is made at the same time as the adjustment of the tank 32 for bottles of different heights, and that the tank 32 is manually adjusted for bottles of different heights, as previously described.

As a means of taking up slack in the endless chain 2, the sprocket wheel 5 is adjustably supported from the block 101 through the vertical shaft 15', and said block 101 is rigidly supported from two supporting rods 102, which rods 102 are slidably supported from the platform 1 by the brackets 103 and 104. Spiral springs 105 are interposed between the brackets 103 and 104, and said block 101 and said springs are adapted by their recoil to move said sprocket wheel 15 away from the opposing sprocket wheels 3 and 4 from which the opposite end of said endless chain is supported, whereby the slack in said endless chain is automatically taken up and the chain is retained at the desired tension. A slot 106 is formed in the platform 1 for the reception of the vertical shaft 15'. The arms 2' are connected with said sprocket chain at short intervals apart as shown by the lugs 107. The lugs 107 are rigidly connected at one end with said links and said lugs are connected with the arms 2' by screws, or in any convenient manner.

It will be understood that the track 28 is stationary and that while the rollers 35', which have revoluble bearings in connection with the trailing arms 25', are caused to move downwardly and upwardly as they pass over the inclined surfaces 34 of said track as said pulley traverses the marginal edge of the same, the pulleys 108 simultaneously travel on the inner portion 109 of said track and that such inner portion of the track is formed upon the same plane throughout its entire length, whereby the pulley supporting shafts 34' and the cylindrical members 33' are at all times retained upon the same plane throughout the entire circle described by the revoluble disk 24 and the mechanism supported therefrom are also caused to describe a circle around the supporting shaft 17 upon the same plane, while the trailing arms 25', which are supported by said rollers 35', are caused to move upwardly and downwardly as it passes over said inclined members 34 on the track as the bottles are brought into and out of contact with the filling nozzles of the tank.

If for any unforeseen reason the bottle supporting disks 15 could not be forced down by the normal action of the spiral springs 32' as the rollers 35' pass down the incline 34 of the track, as might some time be the case when broken glass or other material interferes with the normal action of the device, I have provided a stationary curved cam 110, which is rigidly affixed to the frame of the machine and its outer end is adapted to contact with the protruding ends of the pins 26', which ends are adapted to project past the lugs 27' of the trailing arms 25', as shown in Fig. 11, whereby as said pins contact with the lower surface of said cam 110, said cam 110 coöperates with the spiral springs 32' in forcing down said arms 25' with which said bottle supporting disks are connected.

Having thus described my invention, what I claim as new, and desire to secure by Letters Patent, is—

1. In a bottling machine, a device for successively raising and retaining the several bottles of a series in contact with the filling nozzle of a revoluble liquid tank, comprising a revoluble conveyer provided with an annular series of apertures for the reception of the bottles to be filled, a series of bottle supporting disks carried by said conveyer respectively registering with said apertures, a stationary track located below said annular conveyer formed on two different horizontal planes connected by an intermediate inclined plane, a series of vertically movable members connected at their upper ends to said bottle supporting disks, a trailer pivotally connected with the lower end of each of said vertically moving members, a roller revolubly connected with the free ends of each of said swinging arms adapted to bear upon said track, whereby as said conveyer is revolved, the bottles of said series are successively raised and brought into contact with the filling nozzle of said revoluble tank.

2. In a machine for filling bottles, a device for adjusting an annular series of bottle carrying brackets to move bottles of different diameters, consisting in the combination of a movable conveyer, provided at its periphery with a plurality of semi-circular recesses, an annular collar adjustably secured to the periphery of said conveyer, provided in its inner vertical surface with a plurality of semi-circular recesses adapted as said collar is turned, to register with the recesses in said conveyer, a key or fastening pin adapted to be inserted in the aperture formed by the junction of said recesses, whereby said collar and said bottle carrying brackets are secured at various points of adjustment to conform to the different diameters of bottles to be filled.

3. In a machine for filling and capping bottles, a device for increasing and diminishing the length of the reciprocating movement of a plurality of bottle carrying arms, whereby said arms are adapted to move bottles of different sizes, said device consisting in the combination of a reciprocating slide, a plurality of bottle carrying arms pivotally connected to said slide, a swinging lever provided with a longitudinal slot, means for connecting the front end of said lever to said slide, a gear wheel revolubly connected at a fixed point to said platform, a trunnion projecting laterally from the side of said gear wheel into the longitudinal slot of said swinging lever, whereby the front end of said lever is caused to vibrate toward the right and left with each revolution of said wheel, a plate rigidly affixed to the platform of the machine, a block slidably supported from said plate, a trunnion rigidly affixed at one end to said slidable block and pivotally connected at its opposite end to the rear end of said swinging lever, and means for manually moving said trunnion toward and from said wheel, whereby the stroke of the front end of said lever and said reciprocating slide are adapted to be manually increased or diminished to correspond with the size of the bottles being filled and capped.

4. In a device of the described class, the combination of a revoluble shaft, an operating lever rigidly affixed at one end to said shaft, means connected with said shaft for simultaneously increasing and diminishing the stroke of a swinging lever by which the bottle carrying arms are moved, and additional means connected with said shaft for simultaneously adjusting and holding a guide bar to conform to the diameter of the various sized bottles moved by said arm, all substantially as and for the purpose specified.

5. In a bottle filling machine the combination of a frame, a cam rigidly affixed to said frame, a plurality of trailing arms, each provided with a lateral projection, said projection being adapted as said trailing arms are revolved to contact with said cam, whereby said trailing arms are forced downwardly, all substantially as and for the purpose specified.

In testimony whereof I affix my signature in the presence of two witnesses.

GUSTAV STRANDT.

Witnesses:
  Susie H. Arnold,
  Irma D. Bremer.